United States Patent
Luo

(10) Patent No.: US 10,955,853 B2
(45) Date of Patent: Mar. 23, 2021

(54) SYSTEMS AND METHODS FOR AUTONOMOUS DRIVING

(71) Applicant: BEIJING VOYAGER TECHNOLOGY CO., LTD., Beijing (CN)

(72) Inventor: Wei Luo, Beijing (CN)

(73) Assignee: BEIJING VOYAGER TECHNOLOGY CO., LTD., Beijing (CN)

(*) Notice: Subject to any disclaimer, the term of this patent is extended or adjusted under 35 U.S.C. 154(b) by 150 days.

(21) Appl. No.: 16/232,037

(22) Filed: Dec. 25, 2018

(65) Prior Publication Data

US 2020/0192390 A1 Jun. 18, 2020

Related U.S. Application Data

(63) Continuation of application No. PCT/CN2018/122097, filed on Dec. 19, 2018.

(30) Foreign Application Priority Data

Dec. 18, 2018 (CN) .......................... 201811547279.X

(51) Int. Cl.
*G05D 1/02* (2020.01)
*G05D 1/00* (2006.01)
(Continued)

(52) U.S. Cl.
CPC ........... *G05D 1/0221* (2013.01); *B60W 30/18* (2013.01); *B60W 50/0098* (2013.01);
(Continued)

(58) Field of Classification Search
CPC .. G05D 1/0221; G05D 1/0088; G05D 1/0214; G05D 2201/0213; G06N 20/00;
(Continued)

(56) References Cited

U.S. PATENT DOCUMENTS 10,106,153 B1 10/2018 Xiao et al.
2014/0012479 A1 1/2014 Zhao
(Continued)

FOREIGN PATENT DOCUMENTS

CN 203204384 U 9/2013
CN 103777631 A 5/2014
(Continued)

OTHER PUBLICATIONS

International Search Report in PCT/CN2018/122097 dated Sep. 18, 2019, 5 pages.
(Continued)

*Primary Examiner* — Gertrude Arthur Jeanglaude
(74) *Attorney, Agent, or Firm* — Metis IP LLC

(57) ABSTRACT

The present disclosure relates to systems and methods for autonomous driving. The systems may obtain driving information associated with a vehicle; determine a state of the vehicle; determine one or more candidate control signals and one or more evaluation values corresponding to the one or more candidate control signals based on the driving information and the state of the vehicle by using a trained control model; select a target control signal from the one or more candidate control signals based on the one or more evaluation values; and transmit the target control signal to a control component of the vehicle.

20 Claims, 7 Drawing Sheets

(51) Int. Cl.
*B60W 30/18* (2012.01)
*B60W 50/00* (2006.01)
*G06N 20/00* (2019.01)

(52) U.S. Cl.
CPC ......... *G05D 1/0088* (2013.01); *G05D 1/0214* (2013.01); *G06N 20/00* (2019.01); *B60W 2050/0014* (2013.01); *B60W 2520/105* (2013.01); *B60W 2540/18* (2013.01); *B60W 2552/00* (2020.02); *B60W 2554/00* (2020.02); *B60W 2556/00* (2020.02); *G05D 2201/0213* (2013.01)

(58) Field of Classification Search
CPC ............. B60W 30/18; B60W 50/0098; B60W 2552/00; B60W 2554/00; B60W 2556/00; B60W 2050/0014; B60W 2520/105; B60W 2540/18
USPC .......................................................... 701/27
See application file for complete search history.

(56) References Cited

U.S. PATENT DOCUMENTS

| | | |
|---|---|---|
| 2016/0161950 A1 | 6/2016 | Frangou |
| 2017/0227970 A1 | 8/2017 | Taguchi et al. |
| 2017/0261974 A1 | 9/2017 | Ebe |
| 2017/0357257 A1 | 12/2017 | Yang et al. |
| 2018/0032082 A1 | 2/2018 | Shalev-Shwartz et al. |
| 2018/0136644 A1 | 5/2018 | Levinson et al. |
| 2018/0232585 A1 | 8/2018 | Kim |
| 2018/0348763 A1 | 12/2018 | Jiang et al. |
| 2019/0113918 A1* | 4/2019 | England ................. G05D 1/024 |
| 2019/0265713 A1 | 8/2019 | Zhou et al. |

FOREIGN PATENT DOCUMENTS

| | | |
|---|---|---|
| CN | 105318888 A | 2/2016 |
| CN | 206564616 U | 10/2017 |
| CN | 108196535 A | 6/2018 |
| CN | 108216233 A | 6/2018 |
| CN | 108227710 A | 8/2018 |
| CN | 106657189 A | 10/2018 |
| CN | 108803321 A | 11/2018 |
| WO | 2017074966 A1 | 5/2017 |
| WO | 2018115963 A2 | 6/2018 |
| WO | 2018147872 A1 | 8/2018 |
| WO | 2019206032 A1 | 10/2019 |

OTHER PUBLICATIONS

Written Opinion in PCT/CN2018/122097 dated Sep. 18, 2019, 4 pages.
Han, Xiangmin et al., An Adaptive Cruise Control Algorithm Based on Deep Reinforcement Learning, Computer Engineering, 44(7), 2018, 5 pages.
The Extended European Search Report in European Application No. 18819522.6 dated Mar. 17, 2020, 8 pages.
The Examination Report in Australian Application No. 2018286585 dated Dec. 20, 2019, 9 pages.
Kaushik, M. et al., Learning Driving Behaviors for Automated Cars in Unstructured Environments, The European Conference on Computer Vision (ECCV) Workshops, 2018, 16 pages.
Wang, S. et al., Deep Reinforcement Learning for Autonomous Driving, arXiv.org, 2018, 9 pages.
Buechel, M. et al., Deep Reinforcement Learning for Predictive Longitudinal Control of Automated Vehicles, 21st International Conference on Intelligent Transportation Systems (ITSC), 2018, 7 pages.
Lillicrap, T. P. et al., Continuous Control with Deep Reinforcement Learning, ICLR 2016, 14 pages.
The Second Examination Report in Australian Appication No. 2018286585 dated Jul. 27, 2020, 7 pages.

* cited by examiner

Deep Deterministic Policy Gradient (DDPG) network model

SYSTEMS AND METHODS FOR AUTONOMOUS DRIVING

CROSS-REFERENCE TO RELATED APPLICATIONS

This application is a continuation of International Application No. PCT/CN2018/122097 filed on Dec. 19, 2018 which designates the United States of America and claims priority to Chinese Patent Application No. 201811547279.X filed on Dec. 18, 2018, the contents of which are incorporated herein by reference in their entirety.

TECHNICAL FIELD

The present disclosure generally relates to systems and methods for autonomous driving, and in particular, to systems and methods for determining control signal in autonomous driving.

BACKGROUND

With the development of micro-electronic and robot technologies, the exploration of autonomous driving has developed rapidly nowadays. For an autonomous driving system, it is important to determine a suitable control signal (e.g., an accelerator control signal) based on driving information (e.g., a start location, a defined destination, road condition) associated with a vehicle of the autonomous driving system. Commonly, the autonomous driving system determines the control signal by performing a series of operations, for example, obtaining the driving information, determining a driving action based on the driving information, planning a driving path based on the driving action, determining a control signal based on the driving path, etc. However, if the control signal can be determined more directly, the efficiency of the autonomous driving system can be significantly improved. Therefore, it is desirable to provide systems and methods for determining a control signal based on driving information associated with the vehicle directly, thereby improving performance of the autonomous driving system.

SUMMARY

An aspect of the present disclosure relates to a system for autonomous driving. The system may include at least one storage medium including a set of instructions and at least one processor in communication with the at least one storage medium. When executing the set of instructions, the at least one processor may be directed to cause the system to perform one or more of the following operations. The system may obtain driving information associated with a vehicle. The system may determine a state of the vehicle. The system may determine one or more candidate control signals and one or more evaluation values corresponding to the one or more candidate control signals based on the driving information and the state of the vehicle by using a trained control model. The system may select a target control signal from the one or more candidate control signals based on the one or more evaluation values. The system may transmit the target control signal to a control component of the vehicle.

In some embodiments, the driving information associated with the vehicle may include perception information within a first predetermined range of the vehicle and/or map information within the first predetermined range of the vehicle.

In some embodiments, the perception information may include road condition information and/or obstacle information.

In some embodiments, the state of the vehicle may include a velocity of the vehicle, an acceleration of the vehicle, and/or a steering wheel angle of the vehicle.

In some embodiments, the trained control model may be determined with a training process. The training process may include obtaining a preliminary control model; obtaining preliminary sample driving information, the preliminary sample driving information including preliminary sample perception information within a second predetermined range of a sample vehicle and preliminary sample map information within the second predetermined range of the sample vehicle; obtaining a preliminary sample state of the sample vehicle; determining a preliminary sample control signal based on the preliminary sample driving information, the preliminary sample state of the sample vehicle, and the preliminary control model; determining a preliminary sample evaluation value associated with the preliminary control model based on a preliminary reward value corresponding to the preliminary sample control signal, wherein the preliminary reward value is associated with at least one of a collision condition associated with the preliminary sample control signal, a lane condition associated with the preliminary sample control signal, or a stop condition associated with the preliminary sample control signal; determining whether the preliminary sample evaluation value satisfies a preset condition; and designating the preliminary control model as the trained control model in response to the determination that the preliminary sample evaluation value satisfies the preset condition.

In some embodiments, the training process may further include in response to the determination that the preliminary sample evaluation value does not satisfy the preset condition, performing one or more iterations for updating the preliminary control model until an updated sample evaluation value satisfies the preset condition. Each of the one or more iterations may include determining an updated control model based on a reward value in a previous iteration; obtaining updated sample driving information; estimating an updated sample state of the sample vehicle based on a sample control signal in the previous iteration and a sample state of the sample vehicle in the previous iteration; determining an updated sample control signal based on the updated sample driving information, the updated sample state of the sample vehicle, and the updated control model; determining an updated sample evaluation value associated with the updated control model based on an updated reward value corresponding to the updated sample control signal and a sample evaluation value in the previous iteration; and determining whether the updated sample evaluation value satisfies the preset condition.

In some embodiments, the trained control model may include a Deep Deterministic Policy Gradient (DDPG) network model.

In some embodiments, the system may select the target control signal from the one or more candidate control signals based on the one or more evaluation values according to a predetermined rule.

Another aspect of the present disclosure relates to a method implemented on a computing device. The computing device may include at least one processor, at least one storage medium, and a communication platform connected to a network. The method may include obtaining driving information associated with a vehicle; determining a state of the vehicle; determining one or more candidate control signals and one or more evaluation values corresponding to the one or more candidate control signals based on the driving information and the state of the vehicle by using a trained control model; selecting a target control signal from the one or more candidate control signals based on the one or more evaluation values; and transmitting the target control signal to a control component of the vehicle.

In some embodiments, the driving information associated with the vehicle may include perception information within a first predetermined range of the vehicle and/or map information within the first predetermined range of the vehicle.

In some embodiments, the perception information may include road condition information and/or obstacle information.

In some embodiments, the state of the vehicle may include a velocity of the vehicle, an acceleration of the vehicle, and/or a steering wheel angle of the vehicle.

In some embodiments, the trained control model may be determined with a training process. The training process may include obtaining a preliminary control model; obtaining preliminary sample driving information, the preliminary sample driving information including preliminary sample perception information within a second predetermined range of a sample vehicle and preliminary sample map information within the second predetermined range of the sample vehicle; obtaining a preliminary sample state of the sample vehicle; determining a preliminary sample control signal based on the preliminary sample driving information, the preliminary sample state of the sample vehicle, and the preliminary control model; determining a preliminary sample evaluation value associated with the preliminary control model based on a preliminary reward value corresponding to the preliminary sample control signal, wherein the preliminary reward value is associated with at least one of a collision condition associated with the preliminary sample control signal, a lane condition associated with the preliminary sample control signal, or a stop condition associated with the preliminary sample control signal; determining whether the preliminary sample evaluation value satisfies a preset condition; and designating the preliminary control model as the trained control model in response to the determination that the preliminary sample evaluation value satisfies the preset condition.

In some embodiments, the training process may further include in response to the determination that the preliminary sample evaluation value does not satisfy the preset condition, performing one or more iterations for updating the preliminary control model until an updated sample evaluation value satisfies the preset condition. Each of the one or more iterations may include determining an updated control model based on a reward value in a previous iteration; obtaining updated sample driving information; estimating an updated sample state of the sample vehicle based on a sample control signal in the previous iteration and a sample state of the sample vehicle in the previous iteration; determining an updated sample control signal based on the updated sample driving information, the updated sample state of the sample vehicle, and the updated control model; determining an updated sample evaluation value associated with the updated control model based on an updated reward value corresponding to the updated sample control signal and a sample evaluation value in the previous iteration; and determining whether the updated sample evaluation value satisfies the preset condition.

In some embodiments, the trained control model may include a Deep Deterministic Policy Gradient (DDPG) network model.

In some embodiments, selecting the target control signal from the one or more candidate control signals based on the one or more evaluation values may further include selecting the target control signal from the one or more candidate control signals based on the one or more evaluation values according to a predetermined rule.

A further aspect of the present disclosure relates to a vehicle configured for autonomous driving. The vehicle may include a detecting component, a planning component, and a control component. The planning component may be configured to obtain driving information associated with the vehicle; determine a state of the vehicle; determine one or more candidate control signals and one or more evaluation values corresponding to the one or more candidate control signals based on the driving information and the state of the vehicle by using a trained control model; select a target control signal from the one or more candidate control signals based on the one or more evaluation values; and transmit the target control signal to a control component of the vehicle.

In some embodiments, the driving information associated with the vehicle may include perception information within a first predetermined range of the vehicle and/or map information within the first predetermined range of the vehicle.

In some embodiments, the perception information may include road condition information and/or obstacle information.

In some embodiments, the state of the vehicle may include a velocity of the vehicle, an acceleration of the vehicle, and/or a steering wheel angle of the vehicle.

In some embodiments, the trained control model may be determined with a training process. The training process may include obtaining a preliminary control model; obtaining preliminary sample driving information, the preliminary sample driving information including preliminary sample perception information within a second predetermined range of a sample vehicle and preliminary sample map information within the second predetermined range of the sample vehicle; obtaining a preliminary sample state of the sample vehicle; determining a preliminary sample control signal based on the preliminary sample driving information, the preliminary sample state of the sample vehicle, and the preliminary control model; determining a preliminary sample evaluation value associated with the preliminary control model based on a preliminary reward value corresponding to the preliminary sample control signal, wherein the preliminary reward value is associated with at least one of a collision condition associated with the preliminary sample control signal, a lane condition associated with the preliminary sample control signal, or a stop condition associated with the preliminary sample control signal; determining whether the preliminary sample evaluation value satisfies a preset condition; and designating the preliminary control model as the trained control model in response to the determination that the preliminary sample evaluation value satisfies the preset condition.

In some embodiments, the training process may further include in response to the determination that the preliminary sample evaluation value does not satisfy the preset condition, performing one or more iterations for updating the preliminary control model until an updated sample evaluation value satisfies the preset condition. Each of the one or more iterations may include determining an updated control model based on a reward value in a previous iteration; obtaining updated sample driving information; estimating an updated sample state of the sample vehicle based on a sample control signal in the previous iteration and a sample state of the sample vehicle in the previous iteration; determining an updated sample control signal based on the updated sample driving information, the updated sample state of the sample vehicle, and the updated control model; determining an updated sample evaluation value associated with the updated control model based on an updated reward value corresponding to the updated sample control signal and a sample evaluation value in the previous iteration; and determining whether the updated sample evaluation value satisfies the preset condition.

In some embodiments, the trained control model may include a Deep Deterministic Policy Gradient (DDPG) network model.

In some embodiments, the planning component may be further configured to select the target control signal from the one or more candidate control signals based on the one or more evaluation values according to a predetermined rule.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
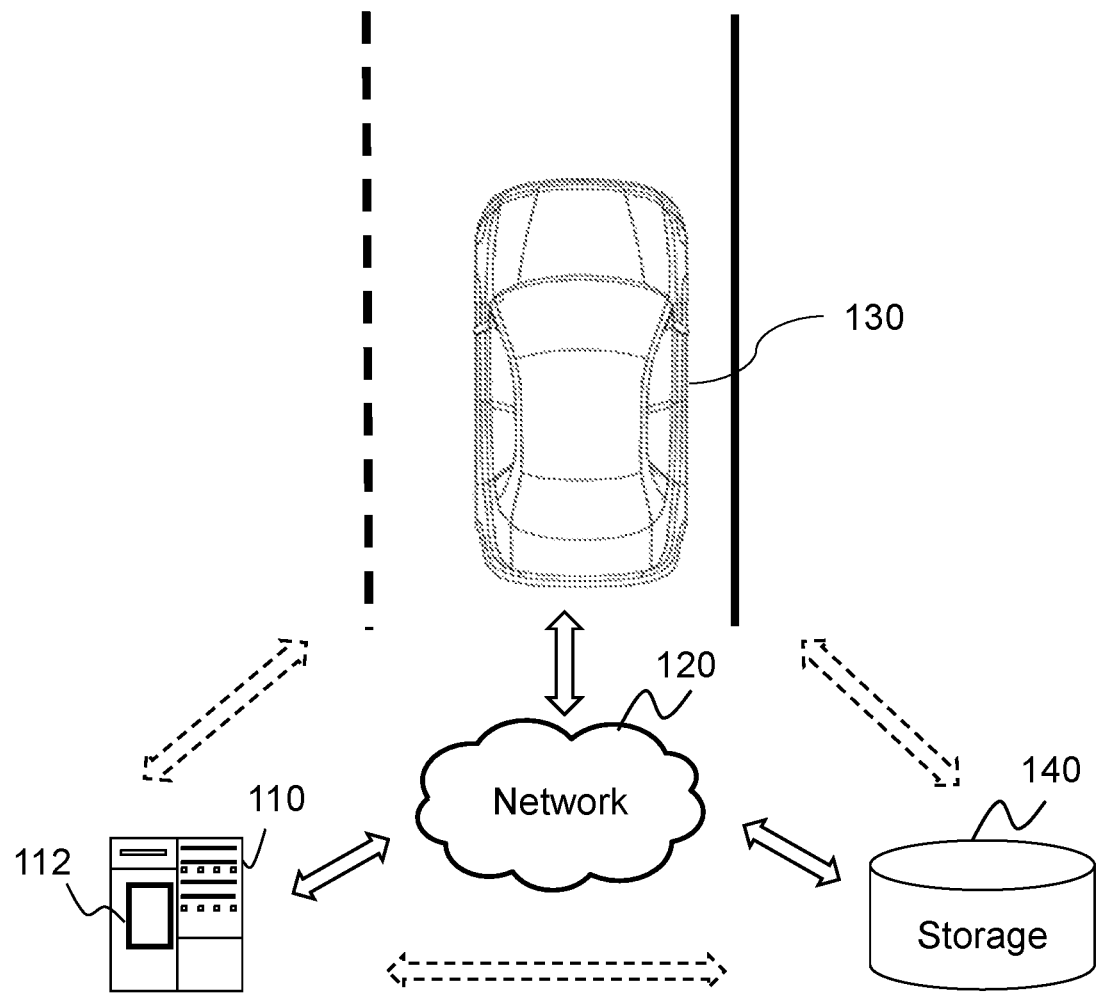
FIG. 1 is a schematic diagram illustrating an exemplary autonomous driving system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding a transportation system in land, it should be understood that this is only one exemplary embodiment. The systems and methods of the present disclosure may be applied to any other kind of transportation system. For example, the systems and methods of the present disclosure may be applied to transportation systems of different environments including ocean, aerospace, or the like, or any combination thereof. The vehicle of the transportation systems may include a car, a bus, a train, a subway, a vessel, an aircraft, a spaceship, a hot-air balloon, or the like, or any combination thereof.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to systems and methods for determining a control signal in autonomous driving. According to some systems and methods of the present disclosure, the processor may obtain driving information (e.g., road condition information, obstacle information, map information) associated with a vehicle, determine a state (e.g., a velocity, an acceleration, a steering wheel angle) of the vehicle, determine one or more candidate control signals and one or more evaluation values corresponding to the one or more candidate control signals based on the driving information and the state of the vehicle by using a trained control model (e.g., a Deep Deterministic Policy Gradient (DDPG) network model), and select a target control signal from the one or more candidate control signals based on the one or more evaluation values. Furthermore, the processor may transmit the target control signal to a control component of the vehicle. According to the systems and methods of the present disclosure, the control signal is determined directly based on a trained model, which can improve the efficiency of the autonomous driving system.

FIG. 1 is a schematic diagram illustrating an exemplary autonomous driving system according to some embodiments of the present disclosure. In some embodiments, the autonomous driving system 100 may include a server 110, a network 120, a vehicle 130, and a storage 140.

In some embodiments, the server 110 may be a single server or a server group. The server group may be centralized or distributed (e.g., the server 110 may be a distributed system). In some embodiments, the server 110 may be local or remote. For example, the server 110 may access information and/or data stored in the vehicle 130 and/or the storage 140 via the network 120. As another example, the server 110 may be directly connected to the vehicle 130 and/or the storage 140 to access stored information and/or data. In some embodiments, the server 110 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 in the present disclosure.

In some embodiments, the server 110 may include a processing engine 112. The processing engine 112 may process information and/or data associated with driving information and/or a state of the vehicle 130 to perform one or more functions described in the present disclosure. For example, the processing engine 112 may obtain driving information (e.g., road condition information, obstacle information) associated with the vehicle 130 and/or a state (e.g., a current location, a current velocity) of the vehicle 130. The processing engine 112 may determine a control signal based on the driving information and/or the state of the vehicle 130. That is, the processing engine 112 may be configured as a planning component of the vehicle 130. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the server 110 may be connected to the network 120 to communicate with one or more components (e.g., the vehicle 130, the storage 140) of the autonomous driving system 100. In some embodiments, the server 110 may be directly connected to or communicate with one or more components (e.g., the vehicle 130, the storage 140) of the autonomous driving system 100. In some embodiments, the server 110 may be integrated in the vehicle 130. For example, the server 110 may be a computing device (e.g., an on-board computer) installed in the vehicle 130.

The network 120 may facilitate exchange of information and/or data. In some embodiments, one or more components (e.g., the server 110, the vehicle 130, or the storage 140) of the autonomous driving system 100 may send information and/or data to other component(s) of the autonomous driving system 100 via the network 120. For example, the server 110 may obtain driving information associated with the vehicle 130 and/or a state of the vehicle 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points, through which one or more components of the autonomous driving system 100 may be connected to the network 120 to exchange data and/or information.

The vehicle 130 may be any type of autonomous vehicle. The autonomous vehicle may be capable of sensing environmental information and navigating without human maneuvering. The vehicle 130 may include structures of a conventional vehicle. For example, the vehicle 130 may include a plurality of control components configured to control operations of the vehicle 130. The plurality of control components may include a steering device (e.g., a steering wheel), a brake device (e.g., a brake pedal), an accelerator, etc. The steering device may be configured to adjust a heading and/or a direction of the vehicle 130. The brake device may be configured to perform a braking operation to stop the vehicle 130. The accelerator may be configured to control a velocity and/or an acceleration of the vehicle 130.

The vehicle 130 may also include a plurality of detection units configured to detect driving information associated with the vehicle 130. The plurality of detection units may include a camera, a global position system (GPS) module, an acceleration sensor (e.g., a piezoelectric sensor), a velocity sensor (e.g., a Hall sensor), a distance sensor (e.g., a radar, a LIDAR, an infrared sensor), a steering angle sensor (e.g., a tilt sensor), a traction-related sensor (e.g., a force sensor), etc. In some embodiments, the driving information associated with the vehicle 130 may include perception information (e.g., road condition information, obstacle information) within a range of the vehicle 130, map information within the range of the vehicle 130, etc.

The storage 140 may store data and/or instructions. In some embodiments, the storage 140 may store data obtained from the vehicle 130, such as driving information and/or a state of the vehicle 130 acquired by the plurality of detection units. In some embodiments, the storage 140 may store data and/or instructions that the server 110 may execute or use to perform exemplary methods described in the present disclosure. In some embodiments, the storage 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 140 may be connected to the network 120 to communicate with one or more components (e.g., the server 110, the vehicle 130) of the autonomous driving system 100. One or more components of the autonomous driving system 100 may access the data or instructions stored in the storage 140 via the network 120. In some embodiments, the storage 140 may be directly connected to or communicate with one or more components (e.g., the server 110, the vehicle 130) of the autonomous driving system 100. In some embodiments, the storage 140 may be part of the server 110. In some embodiments, the storage 140 may be integrated in the vehicle 130.

It should be noted that the autonomous driving system 100 is merely provided for the purposes of illustration, and is not intended to limit the scope of the present disclosure. For persons having ordinary skills in the art, multiple variations or modifications may be made under the teachings of the present disclosure. For example, the autonomous driving system 100 may further include a database, an information source, etc. As another example, the autonomous driving system 100 may be implemented on other devices to realize similar or different functions. However, those variations and modifications do not depart from the scope of the present disclosure.

Figure 2:
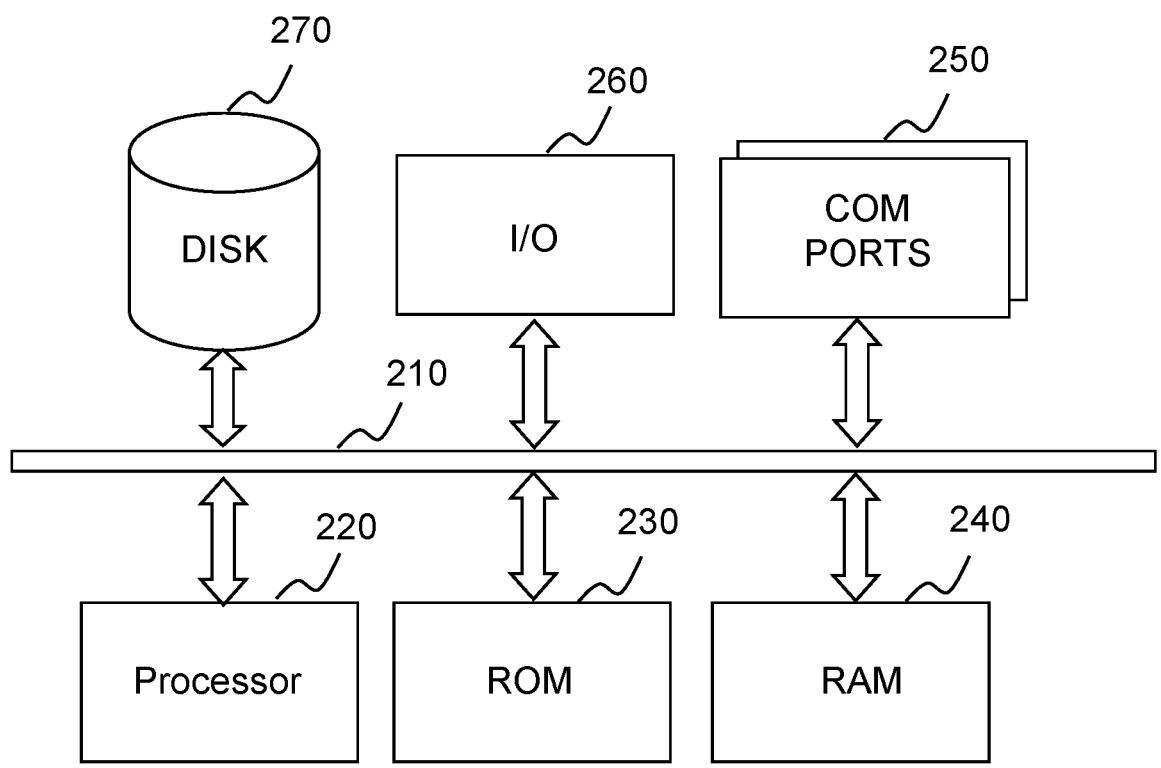
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing engine 112 may be implemented on the computing device 200 and configured to perform functions of the processing engine 112 disclosed in this disclosure.

The computing device 200 may be used to implement any component of the autonomous driving system 100 of the present disclosure. For example, the processing engine 112 of the autonomous driving system 100 may be implemented on the computing device 200, via its hardware, software program, firmware, or a combination thereof. Although only one such computer is shown for convenience, the computer functions related to the autonomous driving system 100 as described herein may be implemented in a distributed manner on a number of similar platforms to distribute the processing load.

The computing device 200, for example, may include communication (COMM) ports 250 connected to and from a network (e.g., the network 120) connected thereto to facilitate data communications. The computing device 200 may also include a processor (e.g., a processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms, for example, a disk 270, and a read only memory (ROM) 230, or a random access memory (RAM) 240, for storing various data files to be processed and/or transmitted by the computing device 200. The computing device 200 may also include program instructions stored in the ROM 230, the RAM 240, and/or other type of non-transitory storage medium to be executed by the processor 220. The methods and/or processes of the present disclosure may be implemented as the program instructions. The computing device 200 also includes an I/O component 260, supporting input/output between the computing device 200 and other components therein. The computing device 200 may also receive programming and data via network communications.

Merely for illustration, only one processor is described in the computing device 200. However, it should be noted that the computing device 200 in the present disclosure may also include multiple processors, and thus operations that are performed by one processor as described in the present disclosure may also be jointly or separately performed by the multiple processors. For example, the processor of the computing device 200 executes both operation A and operation B. As in another example, operation A and operation B may also be performed by two different processors jointly or separately in the computing device 200 (e.g., the first processor executes operation A and the second processor executes operation B, or the first and second processors jointly execute operations A and B).

Figure 3:
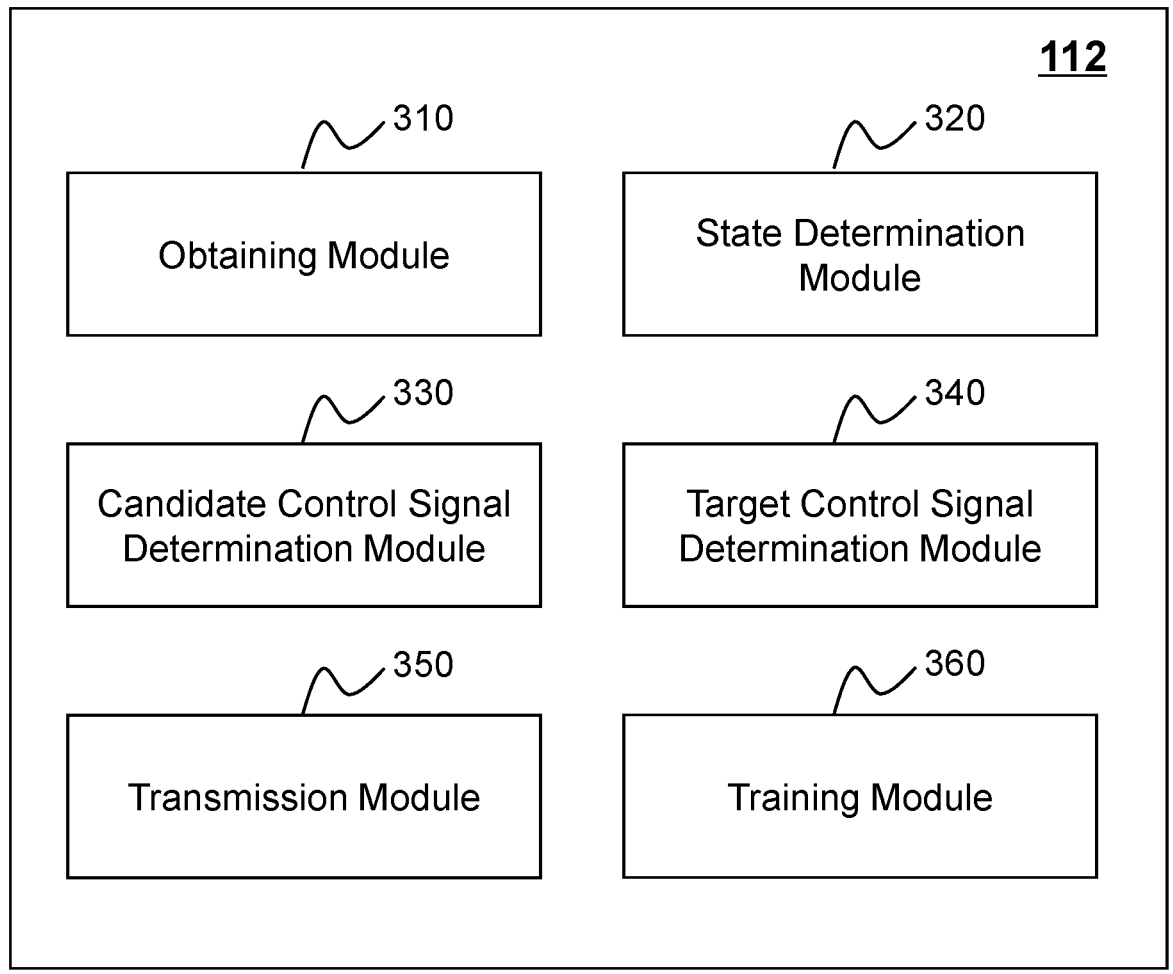
FIG. 3 is a block diagram illustrating an exemplary processing engine according to some embodiments of the present disclosure.

FIG. 3 is a block diagram illustrating an exemplary processing engine according to some embodiments of the present disclosure. The processing engine 112 may include an obtaining module 310, a state determination module 320, a candidate control signal determination module 330, a target control signal determination module 340, a transmission module 350, and a training module 360.

The obtaining module 310 may be configured to obtain driving information associated with a vehicle (e.g., the vehicle 130). The obtaining module 310 may obtain the driving information from the detection units (e.g., a camera, a radar) of the vehicle, a storage device (e.g., the storage 140) disclosed elsewhere in the present disclosure, or an external resource (e.g., a traffic guidance platform, a news platform). The obtaining module 310 may obtain the driving information according to a certain time interval (e.g., 0.01 seconds, 0.02 seconds, 0.05 seconds), in real time, or substantially in real time. More descriptions of the driving information may be found elsewhere in the present disclosure (e.g., FIG. 4 and the descriptions thereof).

The state determination module 320 may be configured to determine a state of the vehicle. The state determination module 320 may determine the state of the vehicle according to a certain time interval (e.g., 0.01 seconds, 0.02 seconds, 0.05 seconds, etc.), in real time, or substantially in real time. More descriptions of the state of the vehicle may be found elsewhere in the present disclosure (e.g., FIG. 4 and the descriptions thereof).

The candidate control signal determination module 330 may be configured to determine one or more candidate control signals and one or more evaluation values corresponding to the one or more candidate control signals based on the driving information and the state of the vehicle by using a trained control model.

The target control signal determination module 340 may be configured to select a target control signal from the one or more candidate control signals based on the one or more evaluation values corresponding to the one or more candidate control signals. In some embodiments, the target control signal determination module 340 may identify a highest evaluation value from the one or more evaluation values corresponding to the one or more candidate control signals and select a candidate control signal corresponding to the highest evaluation value as the target control signal. In some embodiments, target control signal determination module 340 may select the target control signal from the one or more candidate control signals according to a predetermined rule.

The transmission module 350 may be configured to transmit the target control signal to one or more control components of the vehicle. For example, the transmission module 350 may transmit the target control signal to the steering device to direct the steering device to adjust a driving direction of the vehicle. As another example, the transmission module 350 may transmit the target control signal to the brake device and/or the accelerator to direct the brake device and/or the accelerator to adjust a driving speed of the vehicle.

The training module 360 may be configured to determine a trained control model (e.g., a trained DDPG network model) based on sample driving information associated with a sample vehicle and a sample state of the sample vehicle. More descriptions of the determination of the trained control model may be found elsewhere in the present disclosure (e.g., FIGS. 5-7 and descriptions thereof).

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the obtaining module 310 and the state determination module 320 may be combined as a single module which may both obtain the driving information associated with the vehicle and the state of the vehicle. As another example, the candidate control signal determination module 330 and the target control signal determination module 340 may be combined as a single module which may both determine one or more candidate control signals and a target control signal. As a further example, the processing engine 112 may include a storage module (not shown) used to store information and/or data (e.g., the driving information associated with the vehicle, the state of the vehicle) associated with the vehicle. As still a further example, the training module 360 may be unnecessary and the trained control model may be obtained from a storage device (e.g., the storage 140), such as the ones disclosed elsewhere in the present disclosure.

Figure 4:
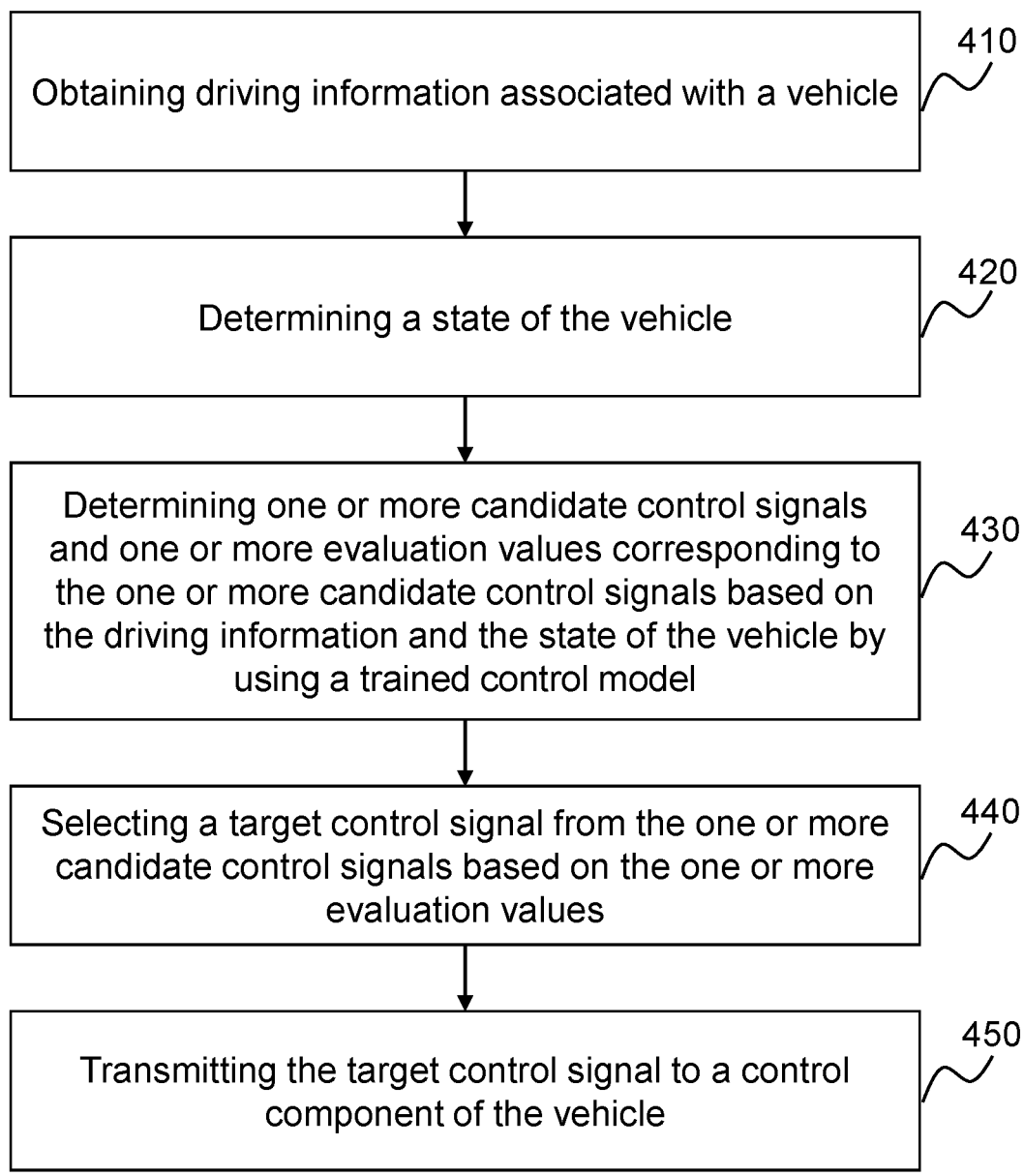
FIG. 4 is a flowchart illustrating an exemplary process for determining a target control signal according to some embodiments of the present disclosure.

FIG. 4 is a flowchart illustrating an exemplary process for determining a target control signal according to some embodiments of the present disclosure. The process 400 may be executed by the autonomous driving system 100. For example, the process 400 may be implemented as a set of instructions stored in the storage ROM 230 or RAM 240. The processor 220 and/or the modules in FIG. 3 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described and/or without one or more of the operations discussed. Additionally, the order in which the operations of the process 400 illustrated in FIG. 4 and described below is not intended to be limiting.

In 410, the processing engine 112 (e.g., the obtaining module 310) (e.g., the interface circuits of the processor 220) may obtain driving information associated with a vehicle (e.g., the vehicle 130). The processing engine 112 may obtain the driving information from the detection units (e.g., a camera, a radar) of the vehicle, a storage device (e.g., the storage 140) disclosed elsewhere in the present disclosure, or an external resource (e.g., a traffic guidance platform, a news platform). The processing engine 112 may obtain the driving information according to a certain time interval (e.g., 0.01 seconds, 0.02 seconds, 0.05 seconds), in real time, or substantially in real time.

In some embodiments, the driving information associated with the vehicle may include perception information within a first predetermined range of the vehicle, map information within the first predetermined range of the vehicle, or the like, or any combination thereof. The first predetermined range may be default settings of the autonomous driving system 100 or may be adjustable under different situations. For example, the first predetermined range may be a region (e.g., a circle, a rectangle, a square, a triangle, a polygon) with a current location of the vehicle as the center.

In some embodiments, the processing engine 112 may obtain the perception information from the detection units (e.g., a camera, a radar) of the vehicle. The perception information may include road condition information, obstacle information, or the like, or any combination thereof. The road condition information may include a road width, a road length, a road type (e.g., expressway, beltway, side road, flyover, one-way road, two-way road), traffic lane information, a traffic sign (e.g., a road indicator), traffic light information, pedestrian crossing information, or the like, or any combination thereof. The obstacle information may include a type of an obstacle (e.g., a vehicle, a pedestrian, an animal, a building, a tree, a roadblock), a location of the obstacle, a size of the obstacle, a velocity of the obstacle, a distance between the current location of the vehicle and the location of the obstacle, or the like, or any combination thereof.

In some embodiments, the processing engine 112 may obtain the map information from a storage device (e.g., the storage 140), such as the ones disclosed elsewhere in the present disclosure. As used herein, in some embodiments, the map information may be information included in a high precision map (e.g., HD map), which indicates high precision expression of the road condition information.

In 420, the processing engine 112 (e.g., the state determination module 320) (e.g., the processing circuits of the processor 220) may determine a state of the vehicle. The processing engine 112 may determine the state of the vehicle according to a certain time interval (e.g., 0.01 seconds, 0.02 seconds, 0.05 seconds, etc.), in real time, or substantially in real time.

In some embodiments, the state of the vehicle may include a current location of the vehicle, a velocity (e.g., an instantaneous velocity, an average velocity within a predetermined time period) of the vehicle, an acceleration (e.g., an instantaneous acceleration, an average acceleration within a predetermined time period) of the vehicle, an angle of a steering wheel of the vehicle, or the like, or any combination thereof. As used herein, the "velocity" includes "magnitude" information and/or "direction" information. For example, the velocity of the vehicle may be expressed as "70 km/h, 30°" which indicates that the magnitude of the velocity is 70 km/h and the direction of the velocity is a direction with a 30° angle from the horizontal direction. Similarly, the "acceleration" also includes "magnitude" information and/or "direction" information. In some embodiments, the state of the vehicle may further include remainder power, remainder gasoline volume, an oil temperature, a gas pressure, a tire pressure, etc.

In some embodiments, the processing engine 112 may obtain the state of the vehicle from the detection units of the vehicle. For example, the processing engine 112 may obtain the acceleration of the vehicle from the acceleration sensor. As another example, the processing engine 112 may obtain the angle of the steering wheel, which reflects an instant turning angle of the vehicle, from the steering angle sensor.

In 430, the processing engine 112 (e.g., the candidate control signal determination module 330) (e.g., the processing circuits of the processor 220) may determine one or more candidate control signals and one or more evaluation values corresponding to the one or more candidate control signals based on the driving information and the state of the vehicle by using a trained control model. As used herein, an evaluation value corresponding to a specific control signal refers to a value which indicates a comprehensive reward (also referred to as an "expected reward") associated with the specific control signal to the driving process of the vehicle.

In some embodiments, a control signal may refer to an instruction configured to control operation of the vehicle. In some embodiments, the control signal may include a plurality of control parameters (e.g., a control parameter associated with the accelerator or the brake device, a steering control parameter). For example, the control signal may be expressed as S (X, Y), where X refers to the control parameter associated with the accelerator or the braking device (e.g., an opening degree) and Y refers to the steering control parameter (e.g., a steering wheel angle). As used herein, for the "opening degree," a positive value indicates an accelerator operation and a negative value indicates a braking operation; for the "steering wheel angle," a positive value indicates "turn right" and a negative value indicates "turn left."

In some embodiments, the processing engine 112 may obtain the trained control model from the training module 360 or a storage device (e.g., the storage 140) disclosed elsewhere in the present disclosure. In some embodiments, the trained control model may include a deep deterministic policy gradient (DDPG) network model. The DDPG network model may be a reinforcement learning model used in machine learning associated with continuous signal matters. With a trained control model, certain aspects of decision making in a normal multiple-factor analysis process can be bypassed, allowing direct determination of the signal to control the operation of the vehicle. More descriptions of the trained control model may be found elsewhere in the present disclosure (e.g., FIGS. 5-7 and the descriptions thereof).

The processing engine 112 (e.g., the candidate control signal determination module 330) (e.g., the processing circuits of the processor 220) may determine the one or more candidate control signals and the one or more evaluation values with different approaches, all involving a trained control model. In some embodiments, there is no limitation as to what control signals can become a candidate control signal. In some embodiments, the processing engine 112 may determine the candidate control signals using a pre-filter approach, i.e. certain control signals can be bypassed before without going through the trained control model and without any chance of becoming a candidate control signal. For example, the system and method of the present disclosure may include a filter that corresponds to the basic specification of the vehicle in question. Such specification may include parameters such as but not limited to maximum speed, maximum acceleration, maximum braking power, maximum turning angle (at a certain speed), etc. The filter may be implemented so that no control signal that exceeds a certain parameter threshold (e.g. 75% of maximum speed, 75% of maximum acceleration, 75% of maximum braking power, or 75% of maximum turning angle) will become a candidate control signal. Such parameters may also be adjusted based on specific year and model of the vehicle, mileage of the vehicle, and/or a pre-determined comprehensive evaluation of the vehicle's condition. With the approach of a pre-filter for the control signals, dangerous and/or limit-breaching types of control signals can be avoided, and the trained control model needs to handle less data, allowing swift and more real-time control of the vehicle. On top of this approach, in some embodiments, the pre-filters can be repressed or bypassed if conditions are met, especially when safety is at stake and all the candidate control signals cannot provide a satisfactory evaluation value.

In 440, the processing engine 112 (e.g., the target control signal determination module 340) (e.g., the processing circuits of the processor 220) may select a target control signal from the one or more candidate control signals based on the one or more evaluation values.

In some embodiments, the processing engine 112 may identify a highest evaluation value from the one or more evaluation values corresponding to the one or more candidate control signals and select a candidate control signal corresponding to the highest evaluation value as the target control signal.

In some embodiments, the processing engine 112 may select the target control signal from the one or more candidate control signals according to one or more predetermined rules. The predetermined rules may be default settings of the autonomous driving system 100 or may be adjustable under different situations. For example, it can be assumed that the processing engine 112 determines two candidate control signals $S_1$ ($X_1$, $Y_1$) and $S_2$ ($X_2$, $Y_2$), wherein an absolute value of $X_1$ is less than that of $X_2$ and an absolute value of $Y_1$ is less than that of $Y_2$. In this situation, the processing engine 112 may select the candidate control signal $S_1$ ($X_1$, $Y_1$) as the target control signal.

The processing engine 112 (e.g., the target control signal determination module 340) (e.g., the processing circuits of the processor 220) may select the target control signal by a multiple-step process. For example, in some embodiments, the processing engine 112 may use the evaluation value for a first step to reduce the candidate control signals and then use certain predetermined rules to finish the selection. As another example, in some embodiments, the processing engine 112 may use certain predetermined rules to remove some candidate control signals, and then select the candidate control signal as the target control signal based on the evaluation value. In some circumstances, the latter approach may prevent the selection of a candidate control signal that presents a "generally" satisfying result but also causes certain damages or consequences that, from a certain perspective, involves long-term and/or unrepairable loss.

In 450, the processing engine 112 (e.g., the transmission module 350) (e.g., the interface circuits of the processor 220) may transmit the target control signal to one or more control components of the vehicle. For example, the processing engine 112 may transmit the target control signal to the steering device to direct the steering device to adjust a driving direction of the vehicle. As another example, the processing engine 112 may transmit the target control signal to the brake device and/or the accelerator to direct the brake device and/or the accelerator to adjust a driving speed of the vehicle.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the process 400. In the storing operation, the processing engine 112 may store information and/or data (e.g., the driving information associated with the vehicle, the state of the vehicle, the candidate control signals) associated with the vehicle in a storage (e.g., the storage 140) disclosed elsewhere in the present disclosure. As another example, operation 410 and operation 420 may be performed simultaneously.

Figure 5:
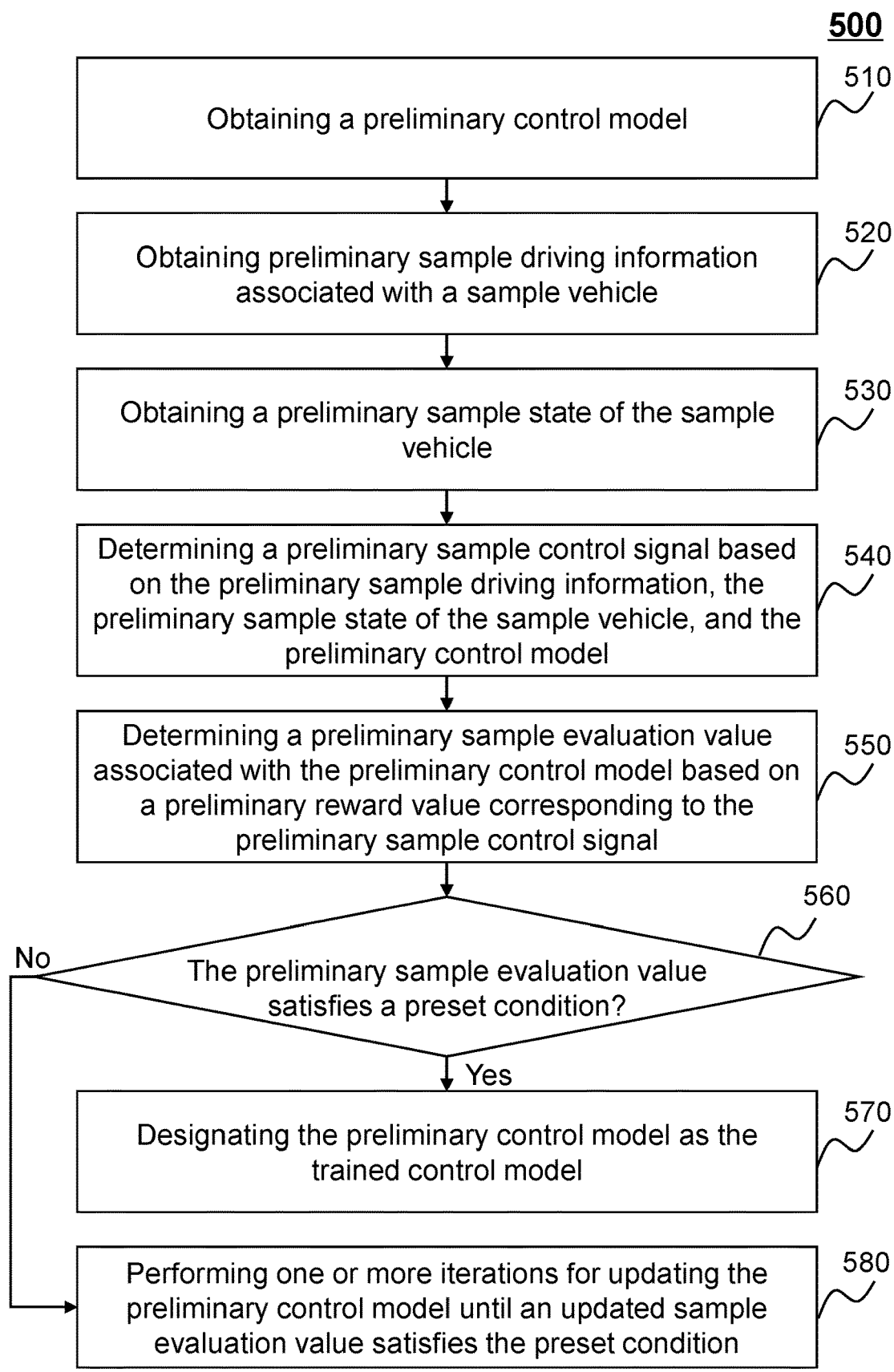
FIG. 5 is a flowchart illustrating an exemplary process for determining a trained control model according to some embodiments of the present disclosure.
Figure 6:
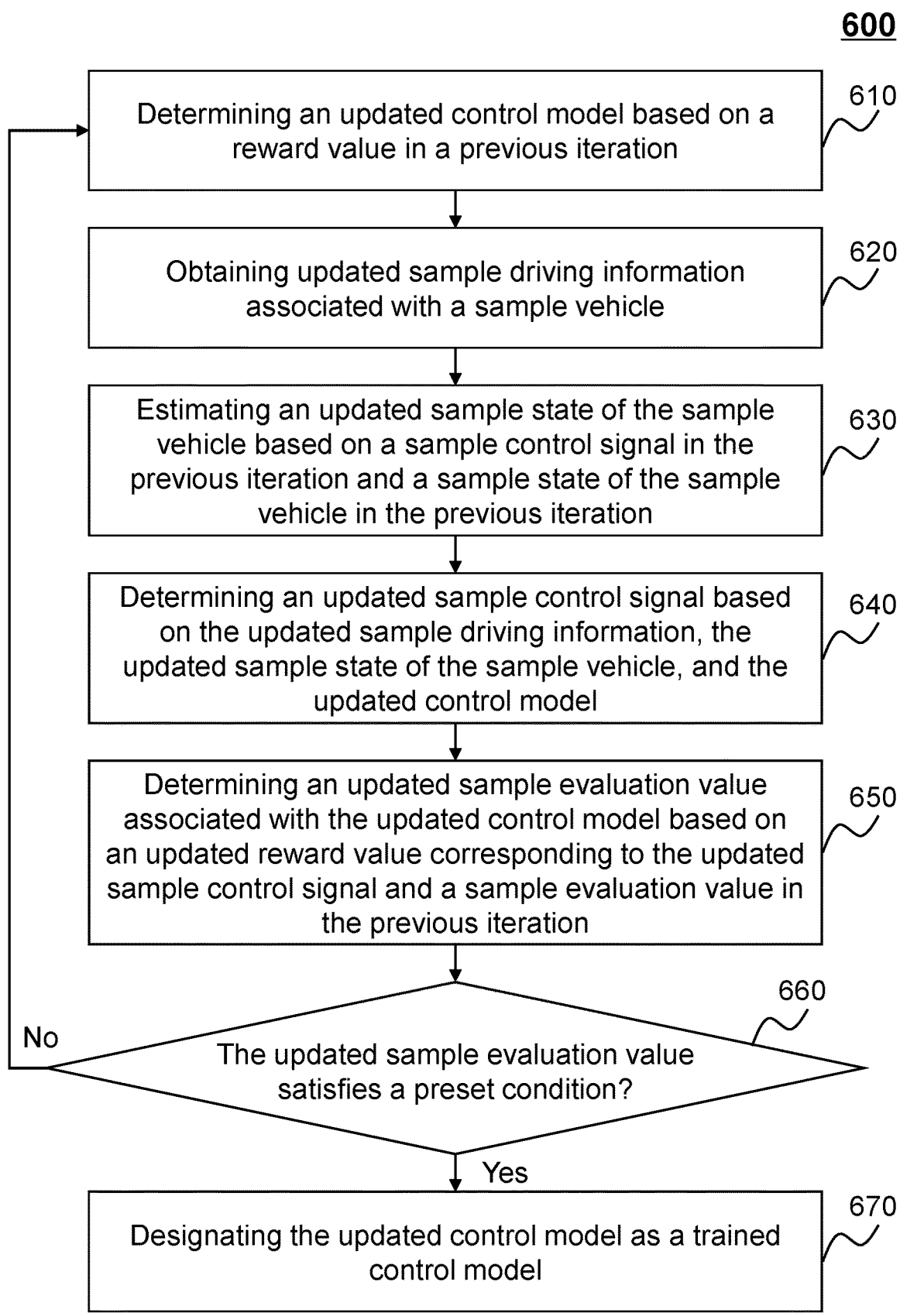
FIG. 6 is a flowchart illustrating an exemplary process for determining a trained control model according to some embodiments of the present disclosure.

FIG. 5 is a flowchart illustrating an exemplary process for determining a trained control model according to some embodiments of the present disclosure. The process 500 may be executed by the autonomous driving system 100. For example, the process 500 may be implemented as a set of instructions stored in the storage ROM 230 or RAM 240. The processor 220 and/or the training module 360 may execute the set of instructions, and when executing the instructions, the processor 220 and/or the training module 360 may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process 500 illustrated in FIG. 5 and described below is not intended to be limiting.

In 510, the processing engine 112 (e.g., the training module 360) (e.g., the interface circuits of the processor 220) may obtain a preliminary control model (e.g., a preliminary deep deterministic policy gradient (DDPG) network model). The processing engine 112 may obtain the preliminary control model from a storage device (e.g., the storage 140) disclosed elsewhere in the present disclosure and/or an external data source (not shown) via the network 120. The preliminary control model may include one or more preliminary parameters which may be default settings of the autonomous driving system 100 or may be adjustable in different situations.

In 520, the processing engine 112 (e.g., the training module 360) (e.g., the processing circuits of the processor 220) may obtain preliminary sample driving information associated with a sample vehicle. In some embodiments, the sample vehicle has similar features (e.g., vehicle type, vehicle model, vehicle year, vehicle weight, engine power) as the vehicle 130.

As described in connection with operation 410, the preliminary sample driving information associated with the sample vehicle may include preliminary sample perception information within a second predetermined range of the sample vehicle, preliminary sample map information within the second predetermined range of the sample vehicle, or the like, or any combination thereof. In some embodiments, the second predetermined range may be the same as or different from the first predetermined range as described in connection with operation 410. The preliminary sample perception information may include preliminary sample road condition information, preliminary sample obstacle information, or the like, or any combination thereof. In some embodiments, the preliminary sample driving information associated with the sample vehicle may be default settings of the autonomous driving system 100 or may be adjustable under different situations.

In 530, the processing engine 112 (e.g., the training module 360) (e.g., the processing circuits of the processor 220) may obtain a preliminary sample state of the sample vehicle.

As described in connection with operation 420, the preliminary sample state of the sample vehicle may include a preliminary sample velocity (e.g., a preliminary sample instantaneous velocity, a preliminary sample average velocity within a predetermined time period) of the sample vehicle, a preliminary sample acceleration (e.g., a preliminary sample instantaneous acceleration, a preliminary sample average acceleration within a predetermined time period) of the sample vehicle, a preliminary sample steering wheel angle of the sample vehicle, or the like, or any combination thereof. In some embodiments, the preliminary sample state of the sample vehicle may further include preliminary sample remainder power, preliminary sample remainder gasoline volume, a preliminary sample oil temperature, a preliminary sample gas pressure, a preliminary sample tire pressure etc. In some embodiments, the preliminary state of the sample vehicle may be default settings of the autonomous driving system 100 or may be adjustable under different situations.

In 540, the processing engine 112 (e.g., the training module 360) (e.g., the processing circuits of the processor 220) may determine a preliminary sample control signal based on the preliminary sample driving information, the preliminary sample state of the sample vehicle, and the preliminary control model. In some embodiments, the processing engine 112 may determine the preliminary sample control signal based on a preliminary actor neural network included in the preliminary control model. As described in connection with operation 430, the preliminary sample control signal may include a plurality of control parameters (e.g., a control parameter associated with the accelerator or the brake device, a steering control parameter). For example, it is assumed that the preliminary sample driving information indicates that there is an obstacle in front of the sample vehicle, the processing engine 112 may determine a preliminary sample control signal for slowing down the sample vehicle according to the preliminary control model.

In 550, the processing engine 112 (e.g., the training module 360) (e.g., the processing circuits of the processor 220) may determine a preliminary sample evaluation value associated with the preliminary control model based on a preliminary reward value corresponding to the preliminary sample control signal. In some embodiments, the processing engine 112 may determine the preliminary sample evaluation value corresponding to the preliminary sample control signal based on a preliminary critic neural network included in the preliminary control model As used herein, take a specific sample control signal as an example, a reward value corresponding to the specific sample control signal may be a parameter which is used to evaluate the contribution of the specific sample control signal to the driving process of the sample vehicle. Also take the specific sample control signal in a specific iteration as an example, an evaluation value corresponding to the specific sample control signal may be a value which indicates a comprehensive reward (also referred to as an "expected reward") associated with the specific sample control signal to the driving process of the sample vehicle up to the specific iteration.

In some embodiments, the preliminary reward value may be associated with a collision condition associated with the preliminary sample control signal, a lane condition associated with the preliminary sample control signal, a stop condition associated with the preliminary sample control signal, or the like, or any combination thereof.

For example, the processing engine 112 may determine a distance (also referred to as an "obstacle distance") between the sample vehicle and an obstacle (which refers to an obstacle nearest to the sample vehicle) under the preliminary sample control signal and determine the preliminary reward value corresponding to the preliminary sample control signal based on the distance. In some embodiments, the processing engine 112 may define a specific range (e.g., 0~1), map the distance between the sample vehicle and the obstacle into the specific range, and designate a corresponding mapping value as the preliminary reward value corresponding to the preliminary sample control signal. For example, it is assumed that the distance between the sample vehicle and the obstacle is longer than a first distance threshold (e.g., 0.5 m), the processing engine 112 may determine that the preliminary reward value corresponding to the preliminary sample control signal is 1; whereas, it is assumed that the distance between the sample vehicle and the obstacle is smaller than a second distance threshold (e.g., 0.01 m) (or the sample vehicle collides with the obstacle), the processing engine 112 may determine that the preliminary reward value corresponding to the preliminary sample control signal is 0. Accordingly, the longer the distance between the sample vehicle and the obstacle is, the higher the preliminary reward value corresponding to the preliminary sample control signal may be. The first distance threshold and/or the second distance threshold may be default settings of the autonomous driving system 100 or may be adjustable under different situations.

As another example, the processing engine 112 may determine a distance (also referred to as a "lane distance") between the sample vehicle and a centerline of a lane where the sample vehicle is located under the preliminary sample control signal and determine the preliminary reward value corresponding to the preliminary sample control signal based on the distance. Similarly, the processing engine 112 may also define a specific range (e.g., 0~1), map the distance between the sample vehicle and the centerline of the lane into the specific range, and designate a corresponding mapping value as the preliminary reward value corresponding to the preliminary sample control signal. For example, it is assumed that the distance between the sample vehicle and the centerline of the lane is longer than a third distance threshold (e.g., 0.5 m), the processing engine 112 may determine that the preliminary reward value corresponding to the preliminary sample control signal is 1; whereas, it is assumed that the distance between the sample vehicle and the centerline of the lane is smaller than a fourth distance threshold (e.g., 0.01 m), the processing engine 112 may determine that the preliminary reward value corresponding to the preliminary sample control signal is 0. Accordingly, the longer the distance between the sample vehicle and the centerline of the lane is, the higher the preliminary reward value corresponding to the preliminary sample control signal may be. The third distance threshold and/or the fourth distance threshold may be default settings of the autonomous driving system 100 or may be adjustable under different situations.

As a further example, the processing engine 112 may determine whether the sample vehicle satisfies the stop condition (e.g., red traffic light, sidewalk) under the preliminary sample control signal. In response to the determination that the sample vehicle satisfies the stop condition under the preliminary sample control signal, the processing engine 112 may determine the preliminary reward value corresponding to the preliminary sample control signal as 1. In response to the determination that the sample vehicle does not satisfy the stop condition under the preliminary sample control signal, the processing engine 112 may determine the preliminary reward value corresponding to the preliminary sample control signal as 0.

In some embodiments, the processing engine 112 may determine a comprehensive reward value based on the preliminary reward values mentioned above (also can be referred to as "candidate preliminary reward values"). For example, the processing engine 112 may determine a sum of the candidate preliminary reward values as the comprehensive reward value. As another example, the processing engine 112 may determine an average (or a weighted average) of the candidate preliminary reward values as the comprehensive reward value.

In some embodiments, the processing engine 112 may determine the preliminary sample evaluation value associated with the preliminary control model based on an action-utility function (also referred to as a Q-function) according to formula (1) below:

$$Q'(s,a)=Q(s,a)+\alpha(r_{i,t}+\lambda Q^*(s,a)) \quad (1)$$

where a refers to a sample control signal in an ith iteration; s refers to a sample state of the sample vehicle in the ith iteration; $Q'(s,a)$ refers to a sample evaluation value associated with a control model in the ith iteration; $Q(s,a)$ refers to a sample evaluation value associated with the control model in a previous iteration (which may be a default value in a first iteration); $Q^*(s,a)$ refers to an optimal sample evaluation value associated with the control model corresponding to the ith iteration; $\alpha$ refers to a learning rate; $r_{i,t}$ refers to a reward value corresponding to the sample control signal in the ith iteration; $\lambda$ refers to a discount factor (e.g., a value within 0~1). In some embodiments, the learning rate and/or the discount factor may be default settings of the autonomous driving system 100 or may be adjustable under different situations. In some embodiments, the optimal sample evaluation value corresponding to the ith iteration may be determined based on a plurality of sample evaluation values determined in a plurality of previous iterations. For example, the optimal evaluation value may be an average of the plurality of sample evaluation values determined in the plurality of previous iterations. As another example, the optimal evaluation value may be a highest sample evaluation value among the plurality of sample evaluation values determined in the plurality of previous iterations.

In 560, the processing engine 112 (e.g., the training module 360) (e.g., the processing circuits of the processor 220) may determine whether the preliminary sample evaluation value satisfies a preset condition.

In some embodiments, the processing engine 112 may determine whether the preliminary sample evaluation value is higher than a first threshold. In response to the determination that the preliminary sample evaluation value is higher than the first threshold, the processing engine 112 may determine that the preliminary sample evaluation value satisfies the preset condition. In response to the determination that the preliminary sample evaluation value is less than or equal to the first threshold, the processing engine 112 may determine that the preliminary sample evaluation value does not satisfy the preset condition.

In some embodiments, the processing engine 112 may determine whether a number count of iterations is higher than a second threshold. In response to the determination that the number count of iterations is higher than the second threshold, the processing engine 112 may determine that the preliminary sample evaluation value satisfies the preset condition. In response to the determination that the number count of iterations is less than or equal to the second threshold, the processing engine 112 may determine that the preliminary sample evaluation value does not satisfy the preset condition. The first threshold and/or the second threshold may be default settings of the autonomous driving system 100 or may be adjustable under different situations.

In some embodiments, the processing engine 112 may determine a loss function of the preliminary control model and determine a value of the loss function based on the preliminary sample evaluation value. Further, the processing engine 112 may determine whether the value of the loss function is less than a loss threshold. In response to the determination that the value of the loss function is less than the loss threshold, the processing engine 112 may determine that the preliminary sample evaluation value satisfies the preset condition. In response to the determination that the value of the loss function is higher than or equal to the loss threshold, the processing engine 112 may determine that the preliminary sample evaluation value does not satisfy the preset condition.

In response to the determination that the preliminary sample evaluation value satisfies the preset condition, the processing engine 112 (e.g., the training module 360) (e.g., the processing circuits of the processor 220) may designate the preliminary control model as a trained control model in 570.

In response to the determination that the preliminary sample evaluation value does not satisfy the preset condition, the processing engine 112 (e.g., the training module 360) (e.g., the processing circuits of the processor 220) may execute the process 500 to operation 580 to perform one or more iterations for updating the preliminary control model until an updated sample evaluation value satisfies the preset condition. An exemplary iteration is described below in FIG. 6.

In 610, the processing engine 112 (e.g., the training module 360) (e.g., the processing circuits of the processor 220) may determine an updated control model based on a reward value in a previous iteration.

In some embodiments, the processing engine 112 may determine the updated control model by updating one or more parameters of a control model in the previous iteration (e.g., the one or more preliminary parameters of the preliminary control model), wherein under the updated one or more parameters, the reward value and/or the sample evaluation value may be increased.

In 620, the processing engine 112 (e.g., the training module 360) (e.g., the processing circuits of the processor 220) may obtain updated sample driving information associated with the sample vehicle.

In 630, the processing engine 112 (e.g., the training module 360) (e.g., the processing circuits of the processor 220) may estimate an updated sample state of the sample vehicle based on a sample control signal in the previous iteration and a sample state of the sample vehicle in the previous iteration.

In some embodiments, the processing engine 112 may estimate the updated sample state of the sample vehicle based on the sample control signal in the previous iteration and the sample state of the sample vehicle in the previous iteration according to a simulation model. In some embodiments, the simulation model may be configured with one or more features (e.g., vehicle type, vehicle weight, vehicle model, vehicle year, engine power, brake efficiency) of the sample vehicle, road condition information, obstacle information, map information, or the like, or any combination thereof. The processing engine 112 may simulate operation of the sample vehicle based on the simulation model and determine the updated sample state of the sample vehicle based on a simulation result.

In 640, the processing engine 112 (e.g., the training module 360) (e.g., the processing circuits of the processor 220) may determine an updated sample control signal based on the updated sample driving information, the updated sample state of the sample vehicle, and the updated control model. For example, the processing engine 112 may input the updated sample driving information and the updated sample state of the sample vehicle into the updated control model. The processing engine 112 may determine the updated sample control signal based on an output of the updated control model.

In 650, the processing engine 112 (e.g., the training module 360) (e.g., the processing circuits of the processor 220) may determine an updated sample evaluation value associated with the updated control model based on an updated reward value corresponding to the updated sample control signal and a sample evaluation value in the previous iteration. For example, the processing engine 112 may determine the updated sample evaluation value according to formula (1).

In 660, as described in connection with operation 560, the processing engine 112 (e.g., the training module 360) (e.g., the processing circuits of the processor 220) may determine whether the updated sample evaluation value satisfies a preset condition.

In some embodiments, the processing engine 112 may also determine whether the updated control model is convergent. For example, the processing engine 112 may determine whether a difference value between the update sample evaluation value and a sample evaluation value in a previous iteration is less than a difference threshold. In response to the determination that the difference value is less than the difference threshold, the processing engine 112 may determine that the updated control model is convergent, and accordingly, the processing engine 112 may determine that the updated sample evaluation value satisfies the preset condition. In response to the determination that the difference value is higher than or equal to the difference threshold, the processing engine 112 may determine that the updated sample evaluation value does not satisfy the preset condition.

In response to the determination that updated sample evaluation value satisfies the preset condition, the processing engine 112 may designate the updated control model as the trained control model in 670.

In response to the determination that updated sample evaluation value does not satisfy the preset condition, the processing engine 112 may execute the process 600 to return to operation 610 to update the updated control model (i.e., start a next iteration) until the updated sample evaluation value satisfies the preset condition.

In some embodiments, the reward value corresponding to the sample control signal may be associated with other features (e.g., a velocity, an acceleration) of the sample vehicle under the sample control signal. In some embodiments, the processing engine 112 may define various kinds of reward values and determine various kinds of control models based on the various kinds of reward values. In practical applications, a user can select a specific control model according to specific requirements.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the process 500 and/or the process 600. In the storing operation, the processing engine 112 may store information and/or data (e.g., the sample driving information, the sample state of the sample vehicle) associated with the sample vehicle in a storage (e.g., the storage 140) disclosed elsewhere in the present disclosure. As another example, operation 520 and operation 530 may be performed simultaneously. As a further example, operation 620 and operation 630 may be performed simultaneously.

Figure 7:
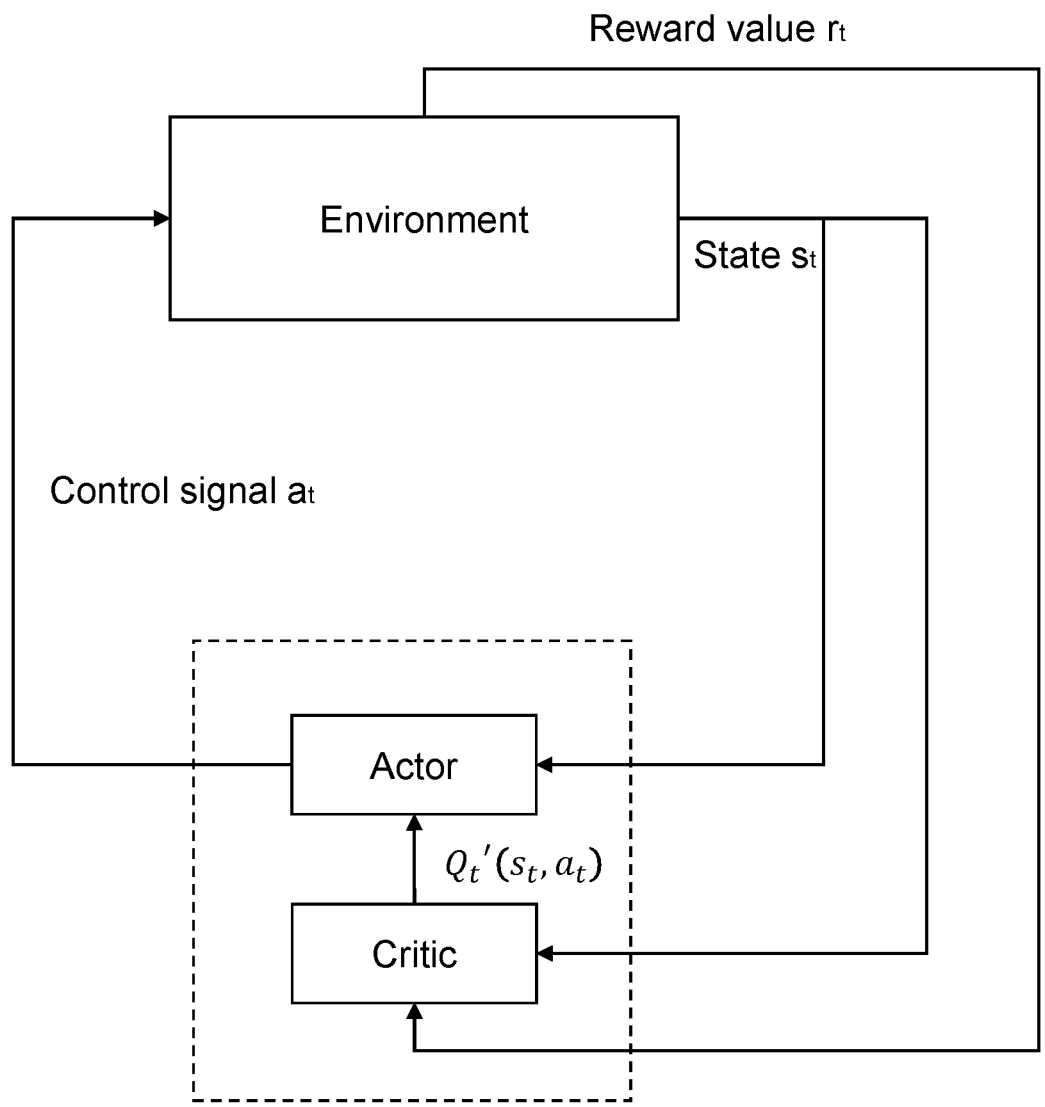
FIG. 7 is a schematic diagram illustrating an exemplary process for training a deep deterministic policy gradient (DDPG) network model according to some embodiments of the present disclosure.

FIG. 7 is a schematic diagram illustrating an exemplary process for training a deep deterministic policy gradient (DDPG) network model according to some embodiments of the present disclosure.

As illustrated in FIG. 7, the DDPG network model includes an actor neural network and a critic neural network, "environment" refers to a scenario in which a sample vehicle is located, and we can assume that the "environment" is a land traffic scenario. According to the present disclosure, it is known that the training process includes one or more iterations and an ith iteration is described here as an example. Specifically, the processing engine 112 may determine a sample state $s_t$ (e.g., a location, a velocity) of the sample vehicle at a time point t. The processing engine 112 may determine a sample control signal $a_t$ corresponding to the time point t for the sample vehicle based on the state $s_t$ of the sample vehicle (sample driving information is omitted here for convenience) according to the actor neural network in the ith iteration. Further, the processing engine 112 may determine a reward value $r_t$ corresponding to the sample control signal $a_t$, and simultaneously or successively, the processing engine 112 may determine a sample evaluation value $Q_t'(s_t,a_t)$ associated with the deep deterministic policy gradient (DDPG) network model corresponding to the sample control signal $a_t$ according to the critic neural network. The processing engine 112 may determine whether the sample evaluation value $Q_t'(s_t,a_t)$ satisfies a preset condition as described in connection with operation 560. In response to the determination that the sample evaluation value $Q_t'(s_t,a_t)$ satisfies the preset condition, the processing engine 112 may designate the DDPG network model in the ith iteration as a final trained DDPG model. In response to the determination that the sample evaluation value $Q_t'(s_t,a_t)$ does not satisfy the preset condition, the processing engine 112 may start a next iteration until an updated sample evaluation value satisfies the preset condition.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for autonomous driving, comprising:
    at least one storage medium including a set of instructions; and
    at least one processor in communication with the at least one storage medium, wherein when executing the set of instructions, the at least one processor is directed to cause the system to:
    obtain driving information associated with a vehicle;
    determine a state of the vehicle;
    determine one or more candidate control signals and one or more evaluation values corresponding to the one or more candidate control signals based on the driving information and the state of the vehicle by using a trained control model;
    select a target control signal from the one or more candidate control signals based on the one or more evaluation values according to a predetermined rule; and
    transmit the target control signal to a control component of the vehicle.

2. The system of claim 1, wherein the driving information associated with the vehicle includes perception information within a first predetermined range of the vehicle and map information within the first predetermined range of the vehicle.

3. The system of claim 2, wherein the perception information includes road condition information and obstacle information.

4. The system of claim 1, wherein the state of the vehicle includes a velocity of the vehicle, an acceleration of the vehicle, and a steering wheel angle of the vehicle.

5. The system of claim 1, wherein the trained control model is determined with a training process, the training process comprising:
    obtaining a preliminary control model;
    obtaining preliminary sample driving information, the preliminary sample driving information including preliminary sample perception information within a second predetermined range of a sample vehicle and preliminary sample map information within the second predetermined range of the sample vehicle;
    obtaining a preliminary sample state of the sample vehicle;
    determining a preliminary sample control signal based on the preliminary sample driving information, the preliminary sample state of the sample vehicle, and the preliminary control model;

determining a preliminary sample evaluation value associated with the preliminary control model based on a preliminary reward value corresponding to the preliminary sample control signal, wherein the preliminary reward value is associated with at least one of a collision condition associated with the preliminary sample control signal, a lane condition associated with the preliminary sample control signal, or a stop condition associated with the preliminary sample control signal;

determining whether the preliminary sample evaluation value satisfies a preset condition; and designating the preliminary control model as the trained control model in response to the determination that the preliminary sample evaluation value satisfies the preset condition.

6. The system of claim 5, wherein the training process further includes:

in response to the determination that the preliminary sample evaluation value does not satisfy the preset condition, performing one or more iterations for updating the preliminary control model until an updated sample evaluation value satisfies the preset condition, wherein each of the one or more iterations includes:
  determining an updated control model based on a reward value in a previous iteration;
  obtaining updated sample driving information;
  estimating an updated sample state of the sample vehicle based on a sample control signal in the previous iteration and a sample state of the sample vehicle in the previous iteration;
  determining an updated sample control signal based on the updated sample driving information, the updated sample state of the sample vehicle, and the updated control model;
  determining an updated sample evaluation value associated with the updated control model based on an updated reward value corresponding to the updated sample control signal and a sample evaluation value in the previous iteration; and
  determining whether the updated sample evaluation value satisfies the preset condition.

7. The system of claim 1, wherein the trained control model includes a Deep Deterministic Policy Gradient (DDPG) network model.

8. A method implemented on a computing device having at least one processor, at least one storage medium, and a communication platform connected to a network, the method comprising:
  obtaining driving information associated with a vehicle;
  determining a state of the vehicle;
  determining one or more candidate control signals and one or more evaluation values corresponding to the one or more candidate control signals based on the driving information and the state of the vehicle by using a trained control model;
  selecting a target control signal from the one or more candidate control signals based on the one or more evaluation values according to a predetermined rule; and
  transmitting the target control signal to a control component of the vehicle.

9. The method of claim 8, wherein the driving information associated with the vehicle includes perception information within a first predetermined range of the vehicle and map information within the first predetermined range of the vehicle.

10. The method of claim 9, wherein the perception information includes road condition information and obstacle information.

11. The method of claim 8, wherein the state of the vehicle includes a velocity of the vehicle, an acceleration of the vehicle, and a steering wheel angle of the vehicle.

12. The method of claim 8, wherein the trained control model is determined with a training process, the training process comprising:
  obtaining a preliminary control model;
  obtaining preliminary sample driving information, the preliminary sample driving information including preliminary sample perception information within a second predetermined range of a sample vehicle and preliminary sample map information within the second predetermined range of the sample vehicle;
  obtaining a preliminary sample state of the sample vehicle;
  determining a preliminary sample control signal based on the preliminary sample driving information, the preliminary sample state of the sample vehicle, and the preliminary control model;
  determining a preliminary sample evaluation value associated with the preliminary control model based on a preliminary reward value corresponding to the preliminary sample control signal, wherein the preliminary reward value is associated with at least one of a collision condition associated with the preliminary sample control signal, a lane condition associated with the preliminary sample control signal, or a stop condition associated with the preliminary sample control signal;
  determining whether the preliminary sample evaluation value satisfies a preset condition; and
  designating the preliminary control model as the trained control model in response to the determination that the preliminary sample evaluation value satisfies the preset condition.

13. The method of claim 12, wherein the training process further includes:
  in response to the determination that the preliminary sample evaluation value does not satisfy the preset condition, performing one or more iterations for updating the preliminary control model until an updated sample evaluation value satisfies the preset condition, wherein each of the one or more iterations includes:
    determining an updated control model based on a reward value in a previous iteration;
    obtaining updated sample driving information;
    estimating an updated sample state of the sample vehicle based on a sample control signal in the previous iteration and a sample state of the sample vehicle in the previous iteration;
    determining an updated sample control signal based on the updated sample driving information, the updated sample state of the sample vehicle, and the updated control model;
    determining an updated sample evaluation value associated with the updated control model based on an updated reward value corresponding to the updated sample control signal and a sample evaluation value in the previous iteration; and
    determining whether the updated sample evaluation value satisfies the preset condition.

14. The method of claim 8, wherein the trained control model includes a Deep Deterministic Policy Gradient (DDPG) network model.

15. A vehicle configured for autonomous driving, comprising:
a detecting component, a planning component, and a control component, wherein the planning component is configured to:
obtain driving information associated with the vehicle;
determine a state of the vehicle;
determine one or more candidate control signals and one or more evaluation values corresponding to the one or more candidate control signals based on the driving information and the state of the vehicle by using a trained control model;
select a target control signal from the one or more candidate control signals based on the one or more evaluation values according to a predetermined rule; and
transmit the target control signal to the control component of the vehicle.

16. The vehicle of claim 15, wherein the driving information associated with the vehicle includes perception information within a first predetermined range of the vehicle and map information within the first predetermined range of the vehicle.

17. The vehicle of claim 15, wherein the trained control model is determined with a training process, the training process comprising:
obtaining a preliminary control model;
obtaining preliminary sample driving information, the preliminary sample driving information including preliminary sample perception information within a second predetermined range of a sample vehicle and preliminary sample map information within the second predetermined range of the sample vehicle;
obtaining a preliminary sample state of the sample vehicle;
determining a preliminary sample control signal based on the preliminary sample driving information, the preliminary sample state of the sample vehicle, and the preliminary control model;
determining a preliminary sample evaluation value associated with the preliminary control model based on a preliminary reward value corresponding to the preliminary sample control signal, wherein the preliminary reward value is associated with at least one of a collision condition associated with the preliminary sample control signal, a lane condition associated with the preliminary sample control signal, or a stop condition associated with the preliminary sample control signal;
determining whether the preliminary sample evaluation value satisfies a preset condition; and
designating the preliminary control model as the trained control model in response to the determination that the preliminary sample evaluation value satisfies the preset condition.

18. The vehicle of claim 17, wherein the training process further includes:
in response to the determination that the preliminary sample evaluation value does not satisfy the preset condition, performing one or more iterations for updating the preliminary control model until an updated sample evaluation value satisfies the preset condition, wherein each of the one or more iterations includes:
determining an updated control model based on a reward value in a previous iteration;
obtaining updated sample driving information;
estimating an updated sample state of the sample vehicle based on a sample control signal in the previous iteration and a sample state of the sample vehicle in the previous iteration;
determining an updated sample control signal based on the updated sample driving information, the updated sample state of the sample vehicle, and the updated control model;
determining an updated sample evaluation value associated with the updated control model based on an updated reward value corresponding to the updated sample control signal and a sample evaluation value in the previous iteration; and
determining whether the updated sample evaluation value satisfies the preset condition.

19. The vehicle of claim 16, wherein the perception information includes road condition information and obstacle information.

20. The vehicle of claim 15, wherein the state of the vehicle includes a velocity of the vehicle, an acceleration of the vehicle, and a steering wheel angle of the vehicle.

* * * * *